United States Patent
Aoki et al.

(10) Patent No.: US 7,069,314 B1
(45) Date of Patent: Jun. 27, 2006

(54) METHOD OF PERFORMING A PROCESS AND CLIENT SERVER SYSTEM

(75) Inventors: Yasuharu Aoki, Kanagawa (JP); Tetsuya Sano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1218 days.

(21) Appl. No.: 09/588,344

(22) Filed: Jun. 7, 2000

(30) Foreign Application Priority Data

Jun. 9, 1999 (JP) ................................. 11-161991

(51) Int. Cl.
*G06F 15/173* (2006.01)
(52) U.S. Cl. ..................... 709/224; 709/203; 709/205; 358/1.2; 358/1.6
(58) Field of Classification Search ................ 709/224, 709/203; 358/1.14, 1.15, 1.2, 527, 537, 538; 345/763, 326, 339, 428; 707/104, 10, 102; 375/240

See application file for complete search history.

(56) References Cited

U.S. PATENT DOCUMENTS

| | | | | |
|---|---|---|---|---|
| 6,078,617 A * | 6/2000 | Nakagawa et al. | ......... | 375/240 |
| 6,289,371 B1 * | 9/2001 | Kumpf et al. | .............. | 709/203 |
| 6,321,231 B1 * | 11/2001 | Jebens et al. | ............ | 707/104.1 |
| 6,330,068 B1 * | 12/2001 | Matsuyama | ................. | 358/1.14 |
| 6,362,895 B1 * | 3/2002 | Laverty et al. | ............ | 358/1.15 |
| 6,459,502 B1 * | 10/2002 | Takamatsu et al. | .......... | 358/1.9 |
| 6,483,524 B1 * | 11/2002 | Petchenkine et al. | ....... | 345/763 |
| 6,507,848 B1 * | 1/2003 | Crosby et al. | .............. | 707/102 |
| 6,559,966 B1 * | 5/2003 | Laverty et al. | ............ | 358/1.15 |
| 6,658,167 B1 * | 12/2003 | Lee et al. | ................... | 382/305 |
| 2002/0057441 A1 * | 5/2002 | Chen et al. | .................. | 358/1.2 |

OTHER PUBLICATIONS

Aldus Corporation, "Open PresPress Interface Specification", Sep. 22, 1993, pp. 5-15.*

* cited by examiner

*Primary Examiner*—David Wiley
*Assistant Examiner*—Phuoc H. Nguyen
(74) *Attorney, Agent, or Firm*—Sughrue Mion, PLLC

(57) ABSTRACT

On a server, an OPI daemon constantly monitors OPI configuration folders which are under control of an OPI, i.e., OPI directories 90. A user mounts a file system of the server from an editing workstation, creates a folder under the OPI directory by operating a mouse or the like under a GUI environment, and copies an authentication file to the folder. The authentication file gives instructions for the folder to be managed as an OPI folder in which the OPI functions can be utilized. Accordingly, on the server, the OPI daemon registers the folder in an OPI database and performs a process for issuing a folder ID, so that the folder is managed as the OPI folder.

35 Claims, 13 Drawing Sheets

F I G. 5
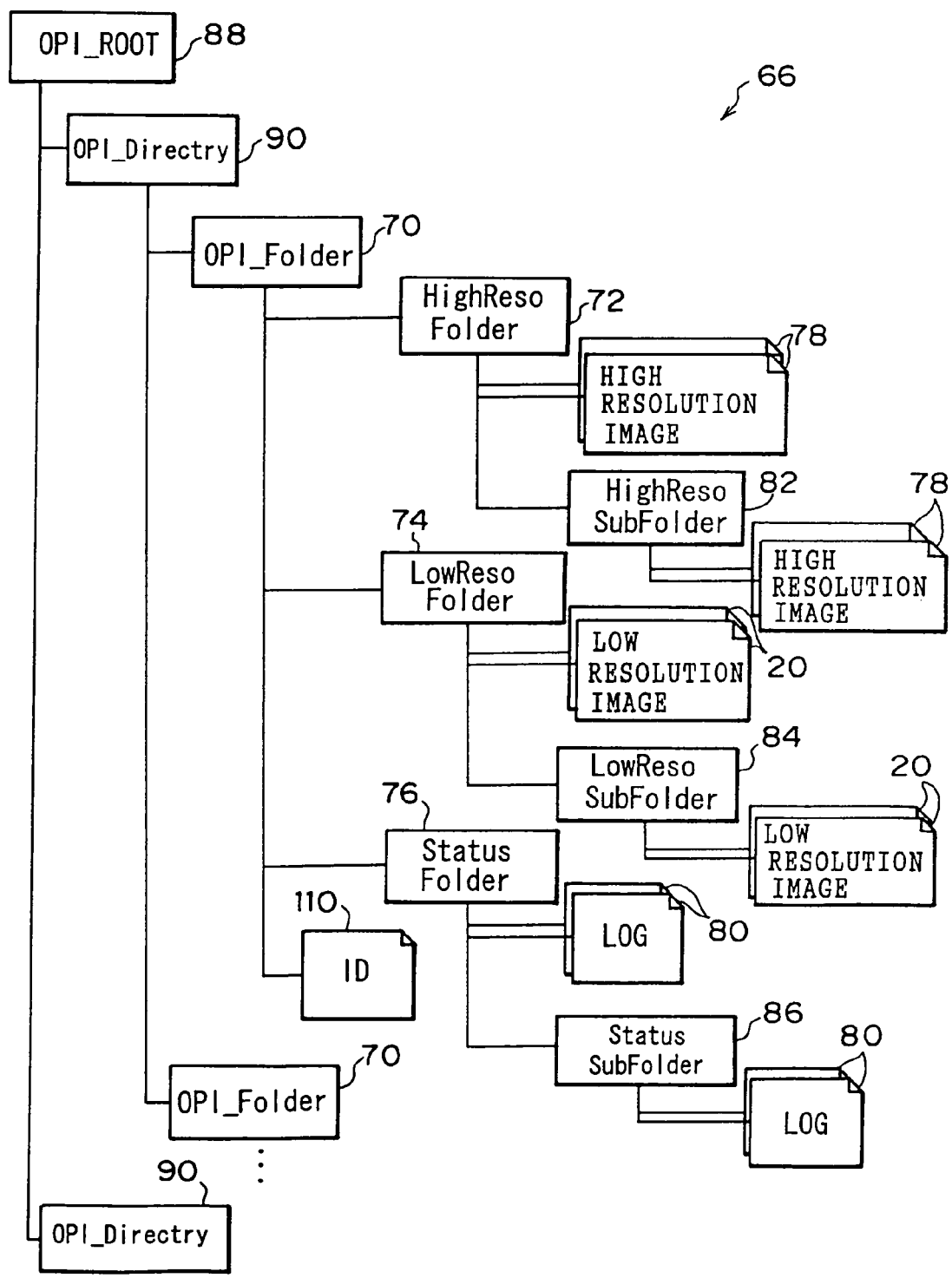

METHOD OF PERFORMING A PROCESS AND CLIENT SERVER SYSTEM

BACKGROUND OF THE INVENTION

1. Field of the Invention

The present invention relates to a method of performing a process and to a client server system. More precisely, the present invention relates to a process performing method which causes a server device to perform a designated operation, and to a client server system for executing a designated image processing, in which a client device and a server device are connected via a network.

2. Description of the Related Art

Due to recent developments in computers, client server systems, in which client device(s) and server device(s) are connected via a network such that the client device(s) and the server device(s) can communicate with each other, have been constructed. In the printing industry, for example, a client server system is utilized for a DTP (Desktop Publishing) in which editing and printing operations of documents are performed by using a personal computer or the like.

In DTP, because image data (original image data) of tens to hundreds of megabytes is used in order to obtain high quality printed matter, an OPI (Open Prepress Interface) has been introduced to a client server system. The OPI creates image data to be displayed (referred to as a "low resolution image", hereinafter) by thinning the original image data (referred to as a "high resolution image", hereinafter), performs an editing operation by using the low resolution image, replaces the low resolution image with the high resolution image at the time of output, and then outputs the high resolution image to an RIP (Raster Image Processor).

FIG. 13 shows a process performed by a standard OPI (so-called "Aldus-OPI"). In FIG. 13, an editing workstation (W/S) 300 as a client device and an OPI server 310 as a server device are connected via a network.

On the editing workstation 300, an editing operation is performed using a low resolution image 304 generated by thinning a high resolution image 302 by means of an editing software (so-called DTP software). When a print command is issued by the user, and PS data 306 is to be output, the editing workstation 300 inserts information about the high resolution image 302 (such as a name of a folder in which the high resolution image 302 is stored, a file name of the high resolution image 302, and a size) which corresponds to the low resolution image 304, instead of the low resolution image 304 itself, into PS data 306 and then outputs PS data 306.

The output PS data 306 is transmitted to the OPI server 310 via a network. On the OPI server 310, the comment 308 in the PS data 306 is analyzed, the corresponding high resolution image 302 is retrieved, and PS data 312 into which the high resolution image 302 is inserted is generated. The PS data 312 is then transmitted to the RIP 314. In the RIP 314, the PS data 312 is analyzed, and a page format image data is created. When the image data is transmitted to an output device, an output (a print) based on the high resolution image 302 can be obtained.

By introducing an OPI into a client server system in such a manner, on a client device (the editing workstation 300) having an inferior throughput compared to a server device (the OPI server 310), an editing operation is performed with a low resolution image having a small data amount (generally about 1 MB), so that a user can perform the editing operation with ease. Moreover, since it is not necessary for the original image data (the high resolution image 302) having a large data amount to be transmitted from the client device (the editing workstation 300) to the server device (the OPI server 310), an increase in the amount of data transmitted (traffic volume) on the network can be avoided, and a deterioration of data transmission efficiency over the entire network system can be prevented.

Generally, in a client server system, a user can make the client server system perform a desired process and obtain the result of the process by operating a client device. Further, when a user utilizes a function provided in a server device, the user uses exclusive-use software from the client device to invoke the function of the server device, thereby causing the server device to perform the desired process.

However, according to the prior art, system development suppliers need to develop softwares designed exclusively to invoke functions of the server device for each type of client device. Further, users need to prepare (install) this exclusive-use software in advance on each client device.

SUMMARY OF THE INVENTION

The present invention is provided so as to solve the aforementioned problems. An object of the present invention is to provide a method of performing a process, which invokes functions of a server device from a client device and performs a process without using exclusive-use software, and a client server system (which realizes the aforementioned method).

In order to achieve the aforementioned object, a first aspect of the present invention is a method of performing a process by means of a server device, the method being used in a client server system for executing a designated data processing, in which a client device and a server device are connected via a network, wherein the server device constantly monitors prescribed folders in the server device, and when a command file which instructs execution of a designated process is recognized in the prescribed folders, the process instructed by the command file is performed.

A second aspect of the present invention is a method of performing a process by means of a server device, the method being used in a client server system for executing a designated image processing, in which a client device and a server device are connected via a network, wherein the server device constantly monitors prescribed folders in the server device; and when a command file which instructs execution of a designated process is recognized in the prescribed folders, the process instructed by the command file is performed.

According to the first and second aspects, the server device constantly monitors prescribed folders in the server device (referred to as "monitor folders", hereinafter), and when a command file which instructs execution of a designated process is recognized in the monitor folders, the server device performs the process instructed by the command file. In such a manner, by simply transferring the command file into the monitor folder, the server device can execute a designated process.

Generally, client server systems are provided with data transfer functions as standard functions. Therefore, a user can transfer the command file into the monitor folder by using the data transfer functions by operating the client device. Thus, a user can make the server device execute a designated process without using software designed exclusively for invoking functions of the server device.

A third aspect of the present invention is a method of performing a process according to the first and second aspects, wherein the client server system configures an OPI system, which creates low resolution image data for editing from high resolution image data, performs an editing operation by using the low resolution image data, and replaces the low resolution image data by the high resolution image data at the time of output, and the command file commands execution of a designated process which is performed in the OPI system.

According to the third aspect, the client server system configures an OPI system. Generally, in the OPI system, a user performs an editing operation by using a low resolution image data on the client device. When functions of the server device are necessary for processes in the OPI system to be carried out, a user can transfer the command file into the monitor folder by simply continuing operation on the client device and it is not necessary to use exclusive-use software. A transfer function provided as a standard function can be used to transfer the command file into the monitor folder.

A fourth aspect of the present invention is a method of performing a process according to the third aspect, wherein the command file instructs transformation of an ordinary folder into a folder in which the OPI system functions, and a transfer of the command file to an ordinary folder in the prescribed folders monitored by the server device causes the ordinary folder to be transformed to the folder in which the OPI system functions.

According to the fourth aspect, a transfer of the command file to an ordinary folder which exists in the monitor folder causes the server device to transform the ordinary folder into a folder in which the OPI system functions (i.e., a folder in which a high resolution image data, a low resolution image data, and the like, which are managed by the OPI system are stored). That is, the folders in which the OPI system functions can be set selectively from the client device without using exclusive-use software.

A fifth aspect of the present invention is a client server system for executing a designated data processing, which is configured with a client device and a server device connected via a network, comprising a folder monitoring device to monitor prescribed folders in the server device; a file transfer device to transfer a command file which instructs execution of a designated process to the prescribed folders monitored by the folder monitoring device; and a process performing device to perform a process instructed by the command file on the server device when the command file is recognized in the prescribed folders.

A sixth aspect of the present invention is a client server system for executing a designated image processing, which is configured with a client device and a server device connected via a network, comprising a folder monitoring device to monitor prescribed folders in the server device; a file transfer device to transfer a command file which instructs execution of a designated process to the prescribed folders monitored by the folder monitoring device; and a process performing device to perform a process instructed by the command file on the server device when the command file is recognized in the prescribed folders.

According to the fifth and sixth aspects of the present invention, the folder monitoring device constantly monitors the prescribed folders in the server device (referred to as "monitor folders", hereinafter) and recognizes a command file when the command file instructing execution of a designated process is transferred to the monitor folder by the file transfer device. When the command file is recognized by the folder monitoring device, the process instructed by the command file is performed on the server device by the process performing device. That is, the server device can be made to execute the designated process by simply transferring the command file to the monitor folder by the transfer device.

Generally, client server systems are provided with data transfer functions as standard functions. Therefore, a user can transfer the command file into the monitor folder by using the data transfer functions of the client device. Accordingly, a user can make the server device execute a designated process without using software designed exclusively for invoking functions of the server device as a transfer device.

Moreover, as is described in a seventh aspect, a client server system may further comprise a data replacing device to replace low resolution image data for editing created from high resolution image data with the high resolution image data, thereby functioning as an OPI system.

BRIEF DESCRIPTION OF THE DRAWINGS

FIG. 5 is a diagram explaining an OPI database.

DESCRIPTION OF THE PREFERRED EMBODIMENTS

Figure 1:
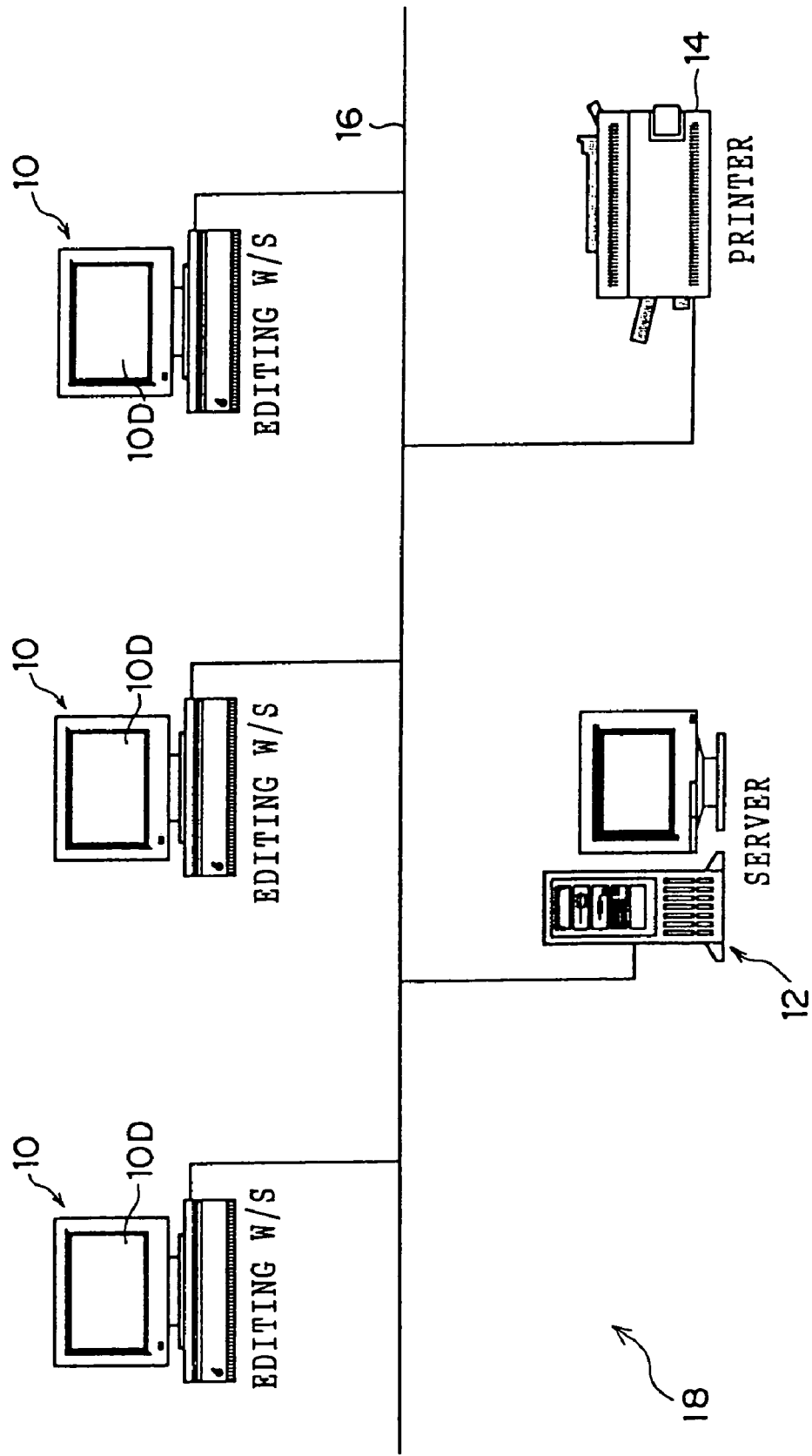
FIG. 1 is a schematic structural diagram of an entire system (client server system) according to an embodiment of the present invention.

Referring to the drawings, one example of embodiments relating to the present invention will be described in detail hereinafter.

(Schematic Configuration of an Entire System)

FIG. 1 illustrates a schematic configuration of a system according to the present embodiment. As shown in FIG. 1, editing workstations 10 as client devices and a server 12 as a server device are interconnected via a network 16, thereby forming a client server system 18. A printer 14 is also connected to the network 16 as an output device. The number of the editing workstations 10, the servers 12, and the printers 14 is not limited to any particular number, and any number of each may be used. However, 3 editing workstations 10, 1 server 12 and 1 printer 14 are used in the present embodiment.

On the editing workstation 10, an editing operation for determining layout of images, texts, lines and the like is performed, and PS data can be transmitted from the editing workstation 10 to the server.

The server 12 can automatically create a low resolution image data (simply referred to as a "low resolution image", hereinafter) having an EPS (i.e., AliasEPS described later) format from a high resolution image data (simply referred to as a "high resolution image", hereinafter). The low resolution image (AliasEPS) is provided in a form which can be used in an editing operation on the editing workstation 10.

The server 12 generates PS data including high resolution images on the basis of the PS data received from the editing workstation 10, generates a page format image data, and finally transmits the image data to the printer 14. The printer 14 performs printing on the basis of the image data to finally output printed matter.

(Outline of Low Resolution Image Having AliasEPS Format)

A low resolution image having an EPS format which is formed on the server 12 by thinning a high resolution image and is used in the editing operation will be described hereinafter.

Figure 2:
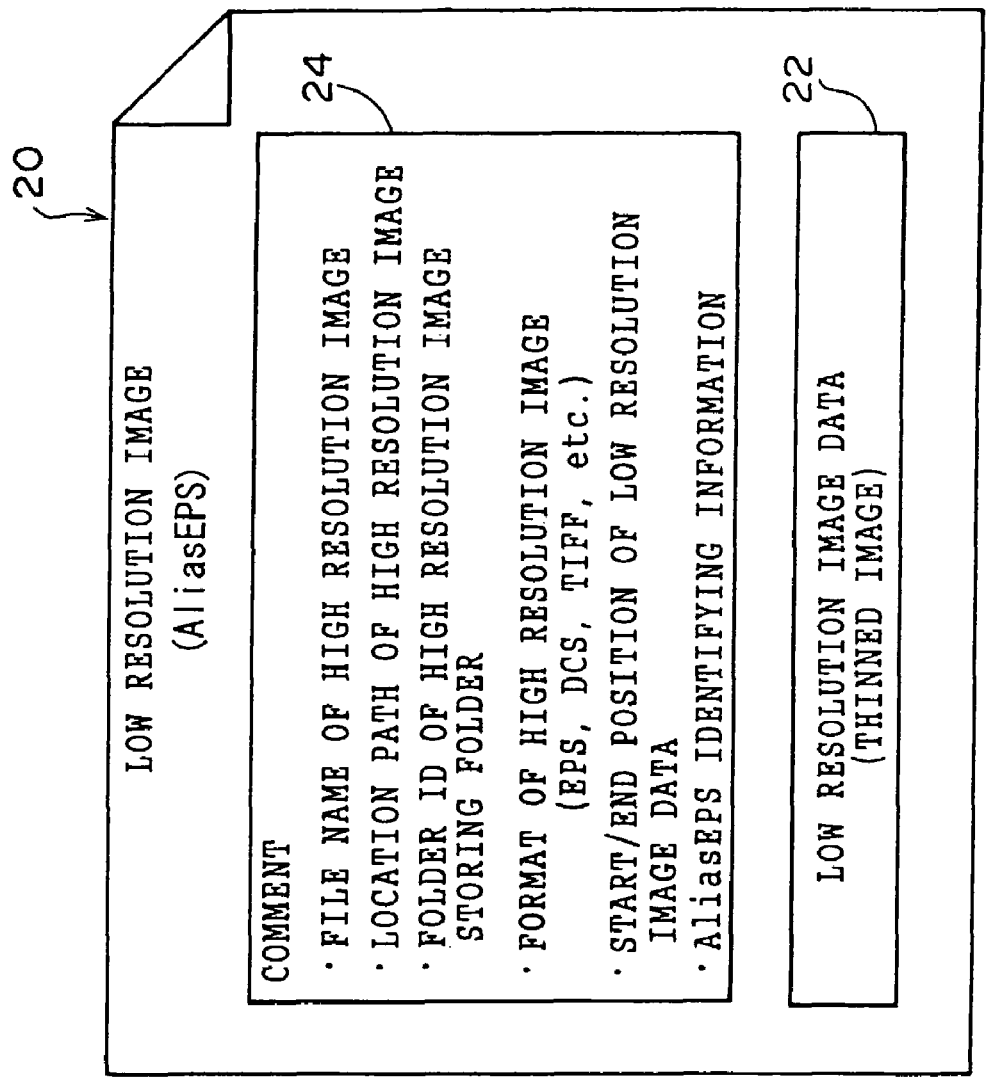
FIG. 2 is a diagram illustrating the structure of a low resolution image having an AliasEPS format.

As shown in FIG. 2, to a low resolution image 20 having the EPS format, information about the original high resolution image is attached as a comment 24 together with a low resolution image data (referred to as a "thinned image", hereinafter) 22 formed by thinning the high resolution image. An EPS format to which the comment 24 about a high resolution image is attached is defined as "AliasEPS".

Specifically, in the comment 24, a file name of the high resolution image, a data location path of the high resolution image (an OPI directory 90 described later, a folder name of an OPI folder 70 and the hierarchical relationship between upper and lower folders), the folder ID of a folder (the OPI folder 70 described later) in which the high resolution image is stored, and the format information of the high resolution image (EPS, TIFF, JPEG, GIF, PICT, etc.) are described. In the comment 24, besides the above-described information, start/end positions of the low resolution image and identifying information indicating that the data itself has an AliasEPS format are also described.

The comment 24 is used by an OPI filter 106 described later, and is ignored by functions other than the OPI filter 106. Therefore, the low resolution image 20 with an AliasEPS format can be handled as data with a normal EPS format by application software. For example, when an attempt is made to display the low resolution image 20 by using an editing software, only the thinned image 22 is displayed. Moreover, when the low resolution image 20 (or PS data including the low resolution image 20) is converted to an image data by an RIP and is then output by the printer 14, only the thinned image is printed without the comment 24.

(Detailed Configuration of Editing Workstation)

Figure 3:
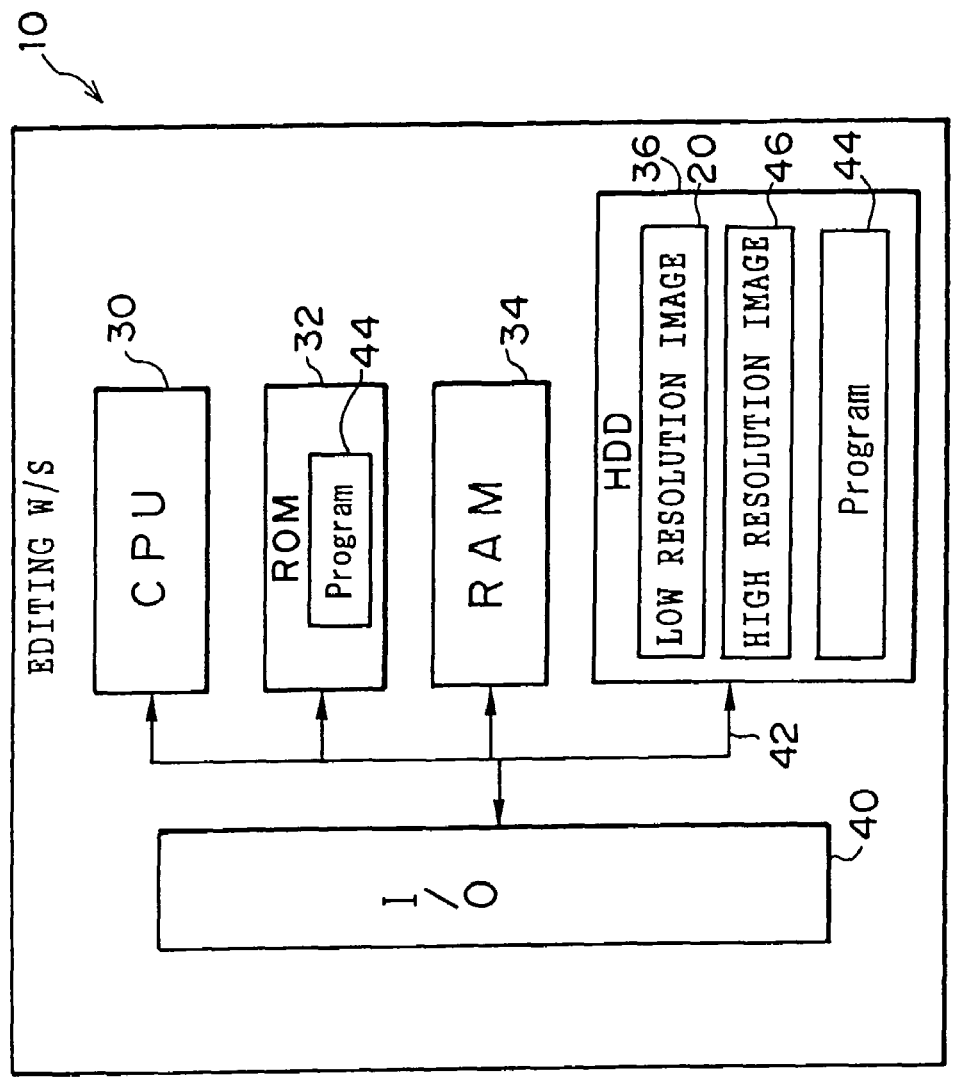
FIG. 3 is a diagram illustrating the structure of an editing workstation.

A detailed configuration of the editing workstation 10 is illustrated in FIG. 3.

As shown in FIG. 3, the editing workstation 10 is configured with a CPU 30, a ROM 32, a RAM 34, an HDD (Hard Disk Drive) 36, and an I/O port 40, and each of these is interconnected via a system bus 42.

In the ROM 32 and the HDD 36, various types of programs 44 such as an OS, an editing software and an image processing software are stored. Besides a kernel which performs tasks and manages resources, the OS includes a network OS (e.g., Macintosh AppleShare and NetWare 386 for Windows) which performs system control between networks, a shell (e.g., Macintosh Finder and Windows Explorer) which controls basic operations and appearance of the OS, and a user interface such as a GUI (Graphical User Interface).

That is, owing to the network OS, a user of the editing workstation 10 can use a disk (such as an HDD) of the server 12 by mounting it as a remote file system without being aware of a difference in file system even if the file system of the editing workstation and that of the server 12 are different. Moreover, under the network OS, a client server system is realized between the editing workstation 10 (client) and the server 12, and the client and the server can send and receive process requests, data, or the like, to and from each other.

Further, the shell (of the editing workstation 10) can be set to display the file system of the server 12. Accordingly, informational data on the server 12 such as a hierarchical structure of folders and files, names of folders and files, and icons corresponding to folders and files can be checked from the editing workstation 10. Moreover, while referring to a display 10D (FIG. 1) on which the shell is displayed, a user can manipulate the file system of the server 12 (by, for example, copying, deleting, moving, modifying names, and creating new folders and files) by using a mouse and a keyboard (by, for example, clicking, dragging, and dropping icons) under a GUI environment.

In the HDD 36, an original image data to be printed (referred to as a "high resolution image", hereinafter) 46 input by a scanner (not shown) or the like, and the low resolution image 20 (AliasEPS) for editing may also be stored. For the editing operation on the editing workstation 10, the low resolution image 20 is generally used. When a print command for the edited page is issued by a user, PS data A including the low resolution image 20 is output (see FIG. 7).

More precisely, a user of the editing workstation 10 performs an editing operation to decide layout of images, texts, lines and the like by using an editing software in the programs 44 and by using a mouse and a keyboard (not shown) under a GUI environment while referring to the display 10D.

If necessary, a user of the editing workstation 10 may also performs various types of image processing, such as highlight processing and transition processing, on the high resolution image 46 by using an image processing software and the like in the programs 44. It is, as expected, possible to mount a disk of the server 12 as described above and to move or copy the high resolution image 46 to a folder onto the mounted disk of the server 12. Further, it is also possible to copy the low resolution image 20 saved in the disk of the server 12 to the HDD 36 to store the image therein.

(Detailed Configuration of the Server)

Figure 4:
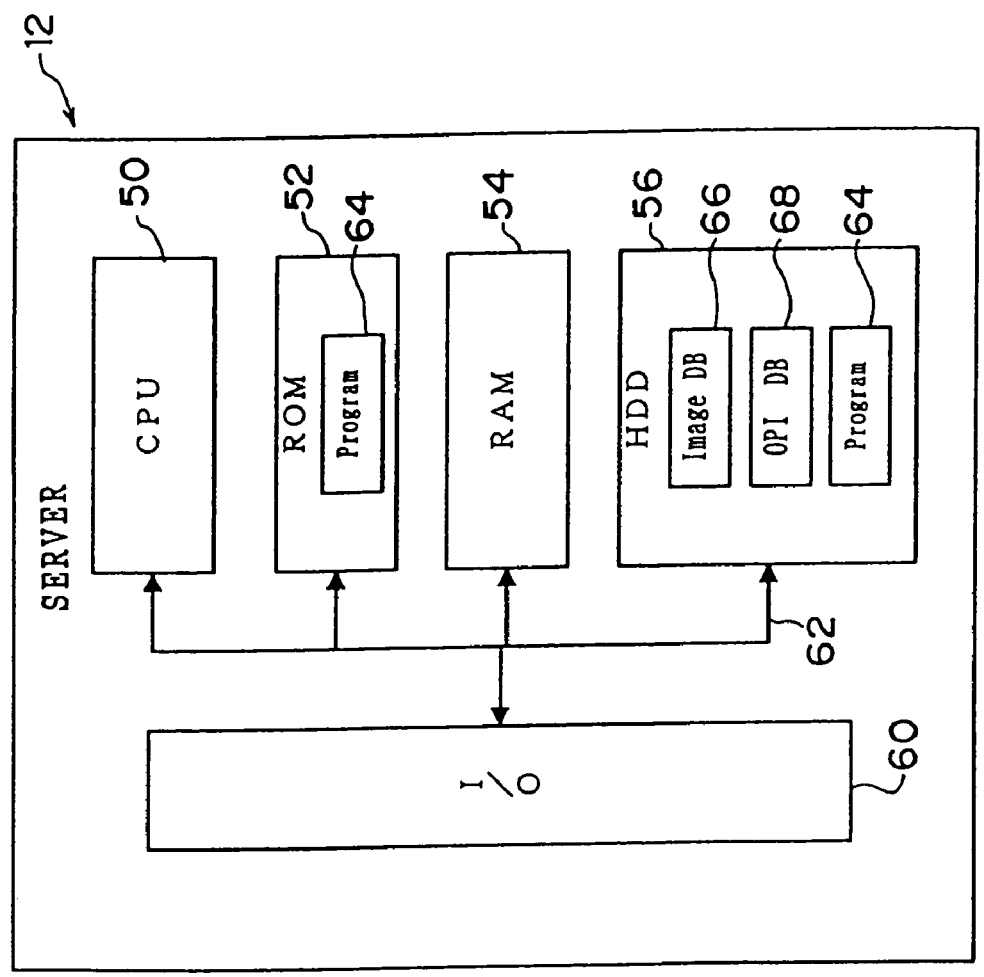
FIG. 4 is a diagram illustrating the structure of a server.

A detailed configuration of the server 12 is illustrated in FIG. 4.

As illustrated in FIG. 4, the server 12 is configured with a CPU 50, a ROM 52, a RAM 54, an HDD 56, and an I/O port 60, and each of these is interconnected via a system bus 62.

In the ROM 52 and the HDD 56, various types of programs 64 are stored. The programs 64 include programs which are part of an OS (including, besides a kernel, a network OS and a user interface in the same manner as that of the above-described editing workstation 10) and programs for executing functions of an OPI 100 and an RIP 102 which are described later. An image transforming program 114 which creates the low resolution image data 20 (AliasEPS) by thinning a high resolution image data (see FIG. 8) is also included in the programs 64. The image transforming program 114 is provided for every format for the high resolution image data (such as EPS, TIFF, JPEG, DCS and PICT) in execute form (i.e., a file generally expressed by "*.exe" where "*" indicates an arbitrary character or character string) which is executable independently without any link with other programs.

In the HDD 56, an image database 66, in which high resolution images and low resolution images are stored in order, and an OPI database 68 are stored.

(Outline of Image Database and OPI Database)

Figure 6:
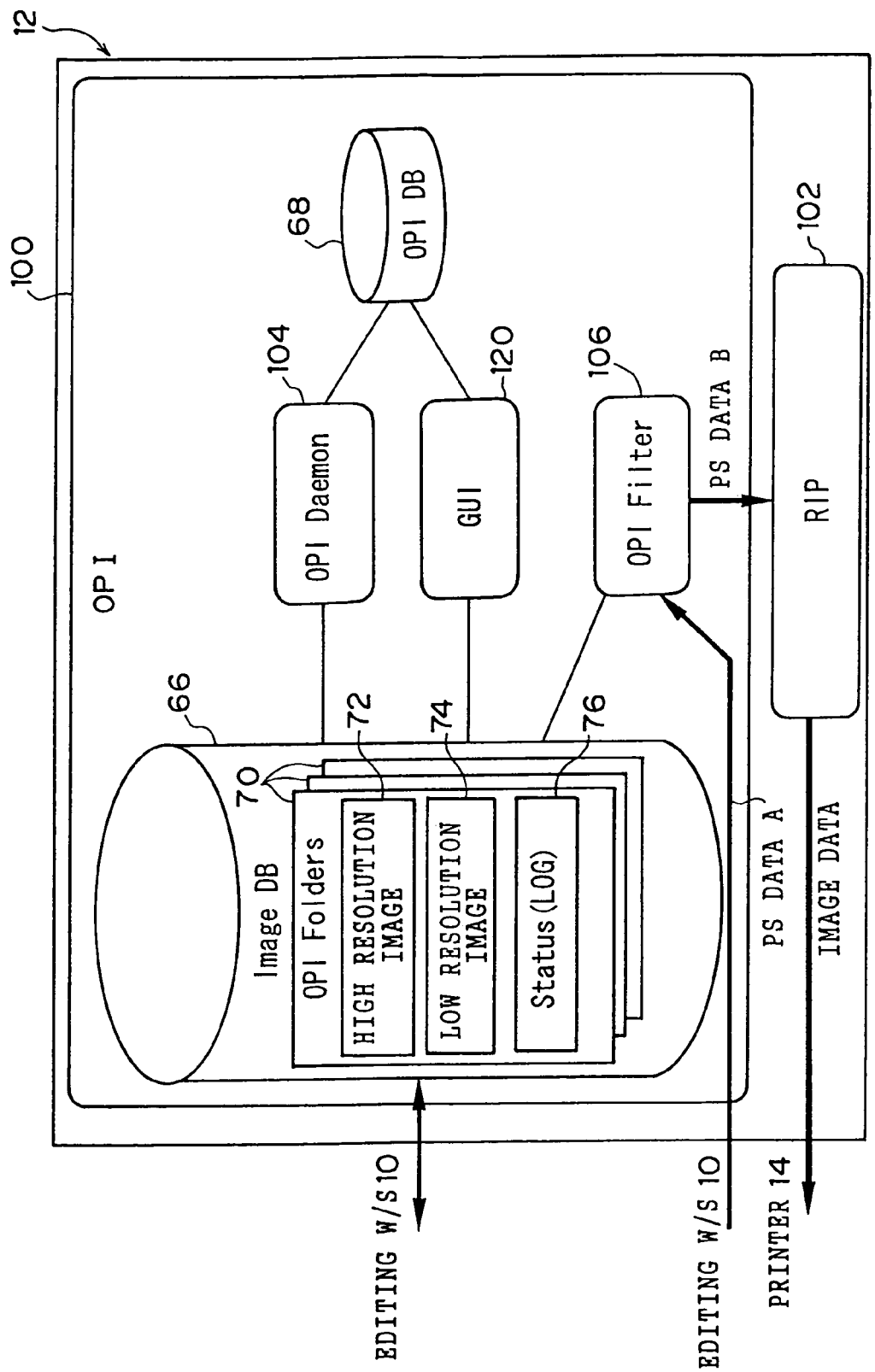
FIG. 6 is a function diagram explaining functions of the server.

In the image database 66, a plurality of OPI folders can be provided as shown in FIGS. 5 and 6. In each of the OPI folders 70, a high resolution image folder 72, a low resolution image folder 74 and a status folder 76 are provided.

In the high resolution image folder 72, high resolution images 78 which are original image data are stored. In the low resolution image folder 74, the low resolution images 20 which are generated by thinning the high resolution images 78 are stored. In the status folder 76, log files 80 which show a status of generation of the low resolution image 20 are stored.

More precisely, in the log file 80, messages issued by the system (such as 'initiated', 'processing', 'normal end', 'abnormal end', and error information) during the process of generating a low resolution image are described. The log file 80 is created such that it corresponds to each of the high resolution images 78 in the high resolution image folder 72.

If necessary, it may also be possible to provide subfolders 82, 84, 86 under the high resolution image folder 72, the low resolution image folder 74, and the status folder 76 respectively in the hierarchy. In these subfolders, the high resolution images 78, the low resolution images 20 and the log files 80 respectively can also be stored.

In each of the OPI folders, an ID file 110, in which a folder ID (described later) is described, is stored. The folder ID allows each of the OPI folders to be uniquely identified.

The OPI folders 70 are provided above OPI directories 90 in the hierarchy as folders managing the OPI folders 70. A user can set any folder as the OPI directory 90 by using a setting tool which is pre-provided (as a tool of the OPI 100 described later) in the server 12. The OPI 100 described later functions in a file system under the OPI directory 90. In the OPI database 66, a folder set as the OPI directory 90 can be handled as if the folder were provided under an OPI root directory 88.

When the file system of the server 12 is mounted from the editing workstation 10 to utilize functions of the OPI 100, the root directory 88 is referred to as a top directory. A user can manipulate the OPI folder 70 (by, for example, folder creation, deletion, name changing, copying, and moving) from the editing workstation 10.

In the OPI database 68, a location path of a folder, which has been set to be the OPI directory 90 as a folder to be managed by the OPI 100 (an OPI configuration folder), is stored. That is, when the OPI directory 90 is set by a user using the setting tool, the path of the folder is registered.

In the OPI database 68, folder names and folder IDs of the OPI folders 70 provided under each of the OPI directories 90 are also stored. Therefore, the location path, the folder name and the folder ID of all the OPI folders 70 can be looked up from the OPI database 68.

In the OPI database 68, a table is stored, in which the image transforming program 114 (execute form) for each image format (such as EPS, TIFF, JPEG, DCS, and PICT) is given. An example of the table is shown in Table 1.

TABLE 1

| Image Format Name (Type) | Image Transforming Program Name |
|---|---|
| EPS | imgeps.exe |
| TIFF | imgtiff.exe |
| JPEG | imgjpeg.exe |
| DCS | imgdcs.exe |
| PICT | imgpict.exe |
| . | . |
| . | . |
| . | . |

Image transforming programs may be prepared for a plurality of resolutions (such as 72 dpi and 144 dpi) so that the low resolution image 20 with a desired resolution (thinning) can be obtained as a desired low resolution image. In this case, the table may be one in which for each image format, the resolution, and the image transforming program 114 are given.

In the OPI database 68, retrieval conditions described later (e.g., a retrieval giving priority to the folder ID, a retrieval giving priority to the folder path, and a retrieval simply by the file name) are also to be stored. A user sets retrieval conditions by using a setting tool pre-provided (as a tool of the OPI 100 described later) on the server 12.

(Server Function)

Figure 7:
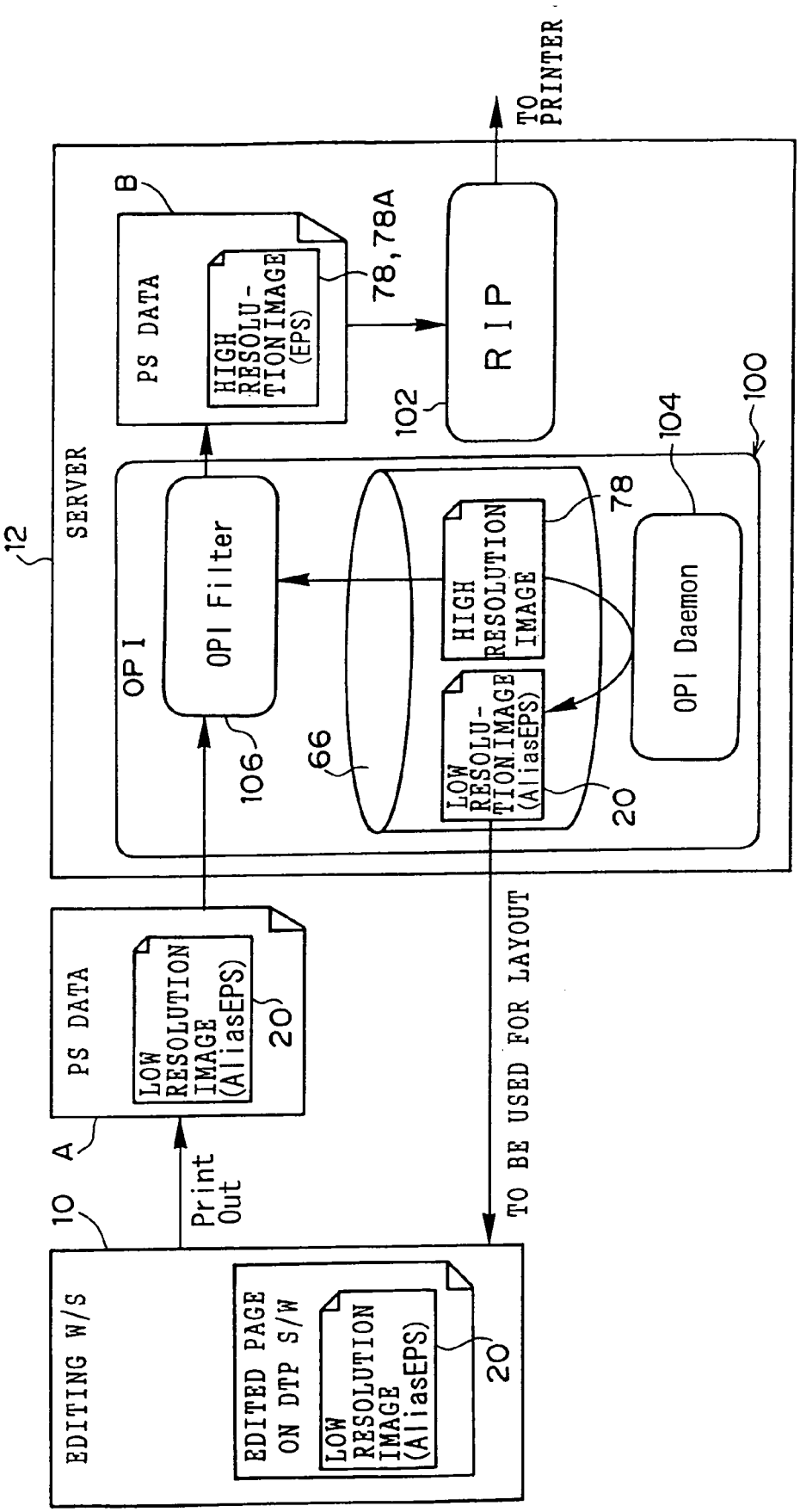
FIG. 7 is a conceptual diagram explaining a process outline according to the present embodiment.

At the server 12, as shown in FIGS. 6 and 7, the OPI 100, which replaces the PS data A generated by editing a low resolution image with PS data B including a high resolution image, and the RIP 102, which converts the PS data B into image data, are caused to function by the programs 64. The OPI 100 and the RIP 102 are both provided on the server 12, in order to avoid a network transmission load which might be caused by the high resolution images in the process of transmission of PS data from the editing workstation 10 to the RIP 102.

The OPI 100 enables manipulation of the OPI database 68 and the image database 66 by utilizing a GUI environment (simply referred to as "GUI", hereinafter) 120. For example, a user of the server 12 can set various parameters of the OPI database 68 by using a keyboard and a mouse (not shown) under the GUI 120. It is, as expected, possible to set various parameters for the OPI database 68 from the editing workstation 10 when the file system of the server 12 is mounted from the editing workstation 10.

In the OPI 100, an OPI daemon 104, which is automatically activated and always active in the background as long as the OPI is active, and an OPI filter 106, which operates upon receiving the PS data A from the editing work station 10, are provided. Functions of the OPI daemon 104 and the OPI filter 106 will be described in detail hereinafter.

(OPI Daemon)

The OPI daemon 104 communicates with the image database 66 and the OPI database 68.

The image database 66 can also be accessed from the editing workstation 10. More precisely, a user can copy, for example, the high resolution image 46 stored in the editing workstation 10 to the high resolution image folder 72 in the image database 66 (i.e., the high resolution image 78 can be created in the high resolution image folder 72) or conversely the low resolution image 20 in the low resolution image folder 74 in the image database 66 can be copied to the editing workstation 10.

Figure 8:
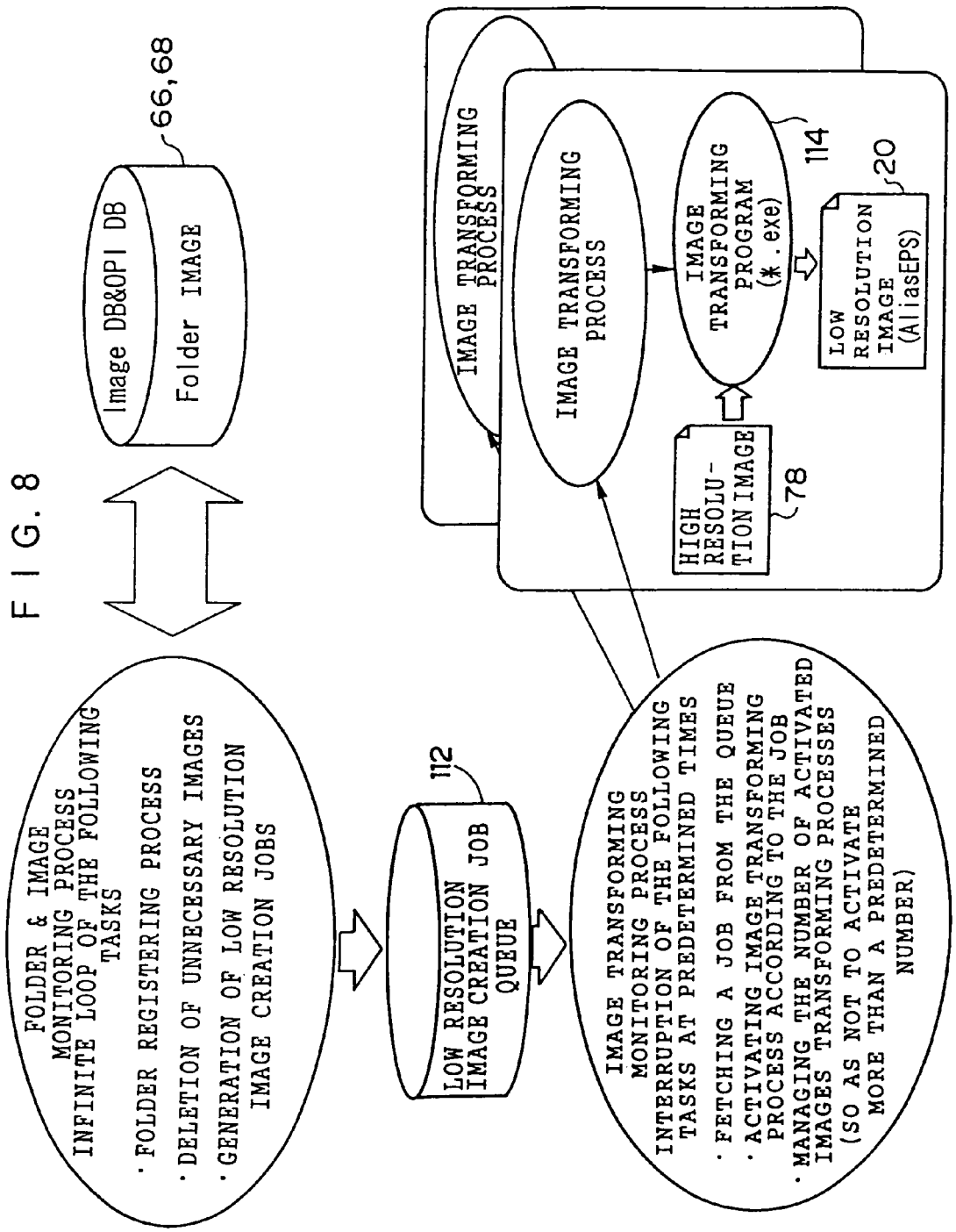
FIG. 8 is a conceptual diagram explaining a process outline performed by an OPI daemon.

In FIG. 8, an outline of a process performed by the OPI daemon 104 is illustrated. The OPI daemon 104 is set to constantly monitor the content of the image database 66, that is, the content of the OPI directories 90. The process is referred to as a "folder and image monitoring process", hereinafter.

When, through the folder and image monitoring process, a folder requested to be managed by the OPI 100 is found, the OPI daemon 104 performs a process in which the folder is registered in the OPI database 68. The process is referred to as a "folder monitoring process", hereinafter.

Figure 9:
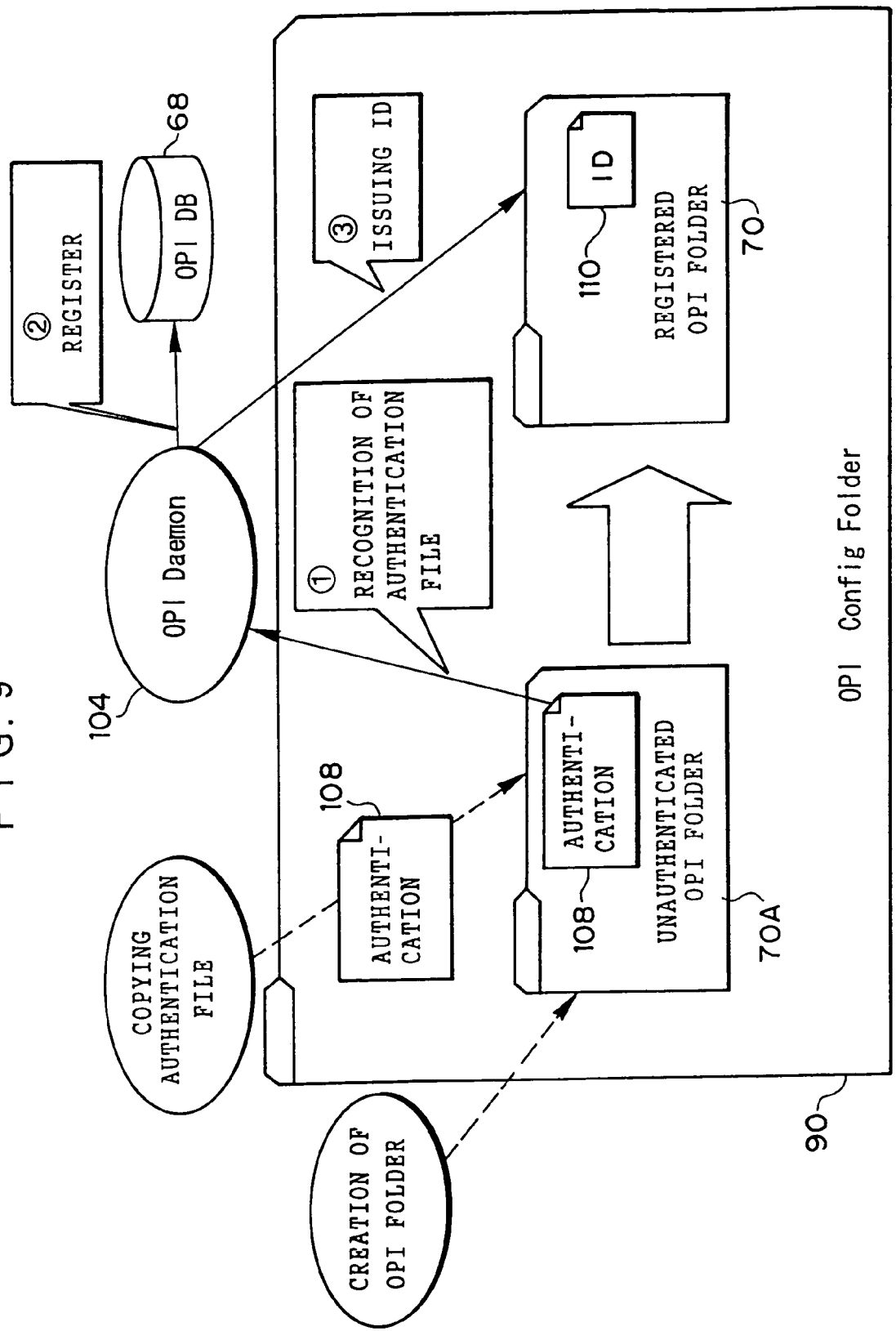
FIG. 9 is a conceptual diagram explaining a folder monitoring process.

More precisely, as shown in FIG. 9, when a user copies a certain file (referred to as an "authentication file", hereinafter) 108 into a newly created folder 70A, a request to manage the folder is issued. The OPI daemon 104 monitors the folders and files under the OPI directories 90, checks whether the authentication file 108 exists, and then determines if the folder 70A in which the authentication file 108 is stored is the folder which was requested for management. Then, a path of the folder 70A in which the authentication file 108 is stored and a unique folder ID for identifying the folder 70A are registered in the OPI database 68. Further, the ID file 110 in which the folder ID is described is created in the folder 70A in which the authentication file 108 is stored, and then the authentication file 108 is deleted.

In this way, in the OPI 100, the folder 70A, which is registered in the OPI database 68 and to which the ID file 110 is provided, is managed as the OPI folder 70. Moreover, a user can create the OPI folder 70 selectively by creating a new folder under the OPI directories 90 and then by copying an authentication file to the newly created folder.

Further, the OPI daemon 104 creates the high resolution image folder 72, the low resolution image folder 74, and the status folder 76 in the OPI folder 70. The OPI 100 makes use only of the high resolution image folder 72, the low resolution image folder 74 and the status folder 76 for operation, and other regions in the OPI folder 70 are not used. That is, a user can freely use other regions in the OPI folder, so that the user can store data (a document file, and the like) used for editing operations directly under the OPI folder 70, for example, or in a folder which is newly created by the user under the OPI folder 70.

Accordingly, it is possible to create the OPI folder 70 for every project, for example, or for every month, and to manage the high resolution images 78, the low resolution images 20, and other related files (document files and the like) together on the basis of projects or by months.

In the folder and image monitoring process, the OPI daemon 104 deletes unnecessary images, if there are any, from the OPI folder 70 registered in the OPI database 68, and if it is necessary to create the low resolution image 20, the OPI daemon 104 generates a low resolution image creation job and registers the job with a low resolution image creation job queue 112. This process is referred to as an "image monitoring process", hereinafter.

Figure 10:
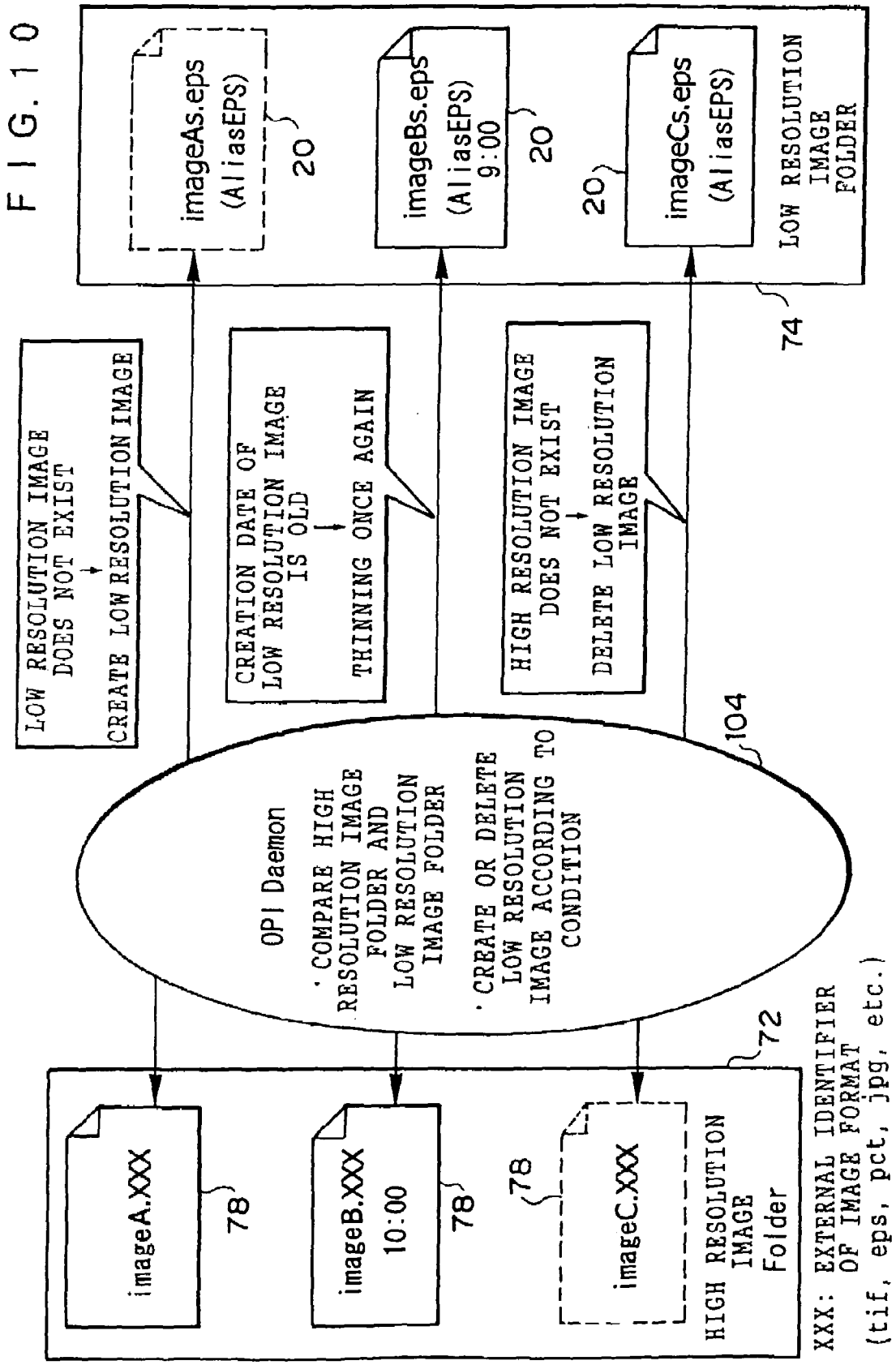
FIG. 10 is a conceptual diagram explaining an image monitoring process.

More precisely, as shown in FIG. 10, the high resolution image 78 and the low resolution image 20 stored respectively in the high resolution image folder 72 and the low resolution image folder 74 in the same OPI folder 70 are compared, and then a low resolution image creation job is newly generated for any high resolution image 78 for which no corresponding low resolution image 20 exists.

Further, when the creation date of the low resolution image 20 is prior to that of the corresponding high resolution image 78, the low resolution image creation job corresponding to the high resolution image 78 is also generated. That is, when the high resolution image 78 is modified somehow after the creation of the low resolution image, the low resolution image creation job is generated to create the low resolution image 20 once again by thinning the high resolution image 78 even if the low resolution image 20 exists.

Further, if a low resolution image 20 for which there is no corresponding high resolution image 78 exists, this low resolution image 20 is deleted.

Moreover, the OPI daemon 104 refers to the low resolution image creation job queue 112 at predefined times. This process is referred to as an "image transforming monitoring process", hereinafter. In the image transforming monitoring process, if there is a low resolution image creation job waiting to be executed in the low resolution image creation job queue 112, the low resolution image creation job is fetched from the low resolution image creation job queue 112. Then, an image transforming process corresponding to the low resolution image creation job is activated. At this time, to prevent retardation of other processes due to the excessive load on the server 12, the number of activated image transforming processes is also restricted so that no more than a predetermined number of the image transforming processes are activated.

In the image transforming process, an image transforming program 114 which corresponds to the format (e.g., EPS, TIFF, JPEG, DCS, and PICT) of the high resolution image 78 can be selected for activation by referring to the table (see Table 1) in the OPI database 68. When the image transforming program 114 is activated, the low resolution image 20 having an AliasEPS format is created from the high resolution image 78.

While the present invention does not particularly limit the file name of the low resolution image 20 which is created, in the present embodiment, as an example, the low resolution image 20 which is created is named automatically such that "s.eps" is added at the end of "the file name of the high resolution image 78 excluding the external identifier portion". For example, if the file name of the high resolution image 78 is "imageA.eps", then the low resolution image 20 which is created is named "imageAs.eps". The low resolution image 20 which is created is stored in the low resolution image folder 74 in the OPI folder 70 having the high resolution image folder 72 thereunder in which the high resolution image 78 is stored. When the creation date of the low resolution image 20 is prior to that of the corresponding high resolution image 78, and the low resolution image 20 is created again accordingly, the same name as that of the old low resolution image 20 is given to the newly created low resolution image 20. Therefore, the old low resolution image 20 is automatically updated to (overwritten by) the newly created low resolution image 20.

The OPI daemon 104 generates the log file 80 at the same time the creation of the low resolution image is initiated. The OPI daemon 104 changes the file name of the log file 80 to correspond with the creation status of the low resolution image 20. Further, the OPI daemon 104 makes comments indicating process status (such as 'initiated', 'processing', 'normal end', 'abnormal end', and error information) in the log file 80.

The present invention does not particularly limit the file name of the log file. In the present embodiment, however, as an example, the file name of the log file 80 is changed to "XXX.continue" during the creation (or processing) of the low resolution image, to "XXX.complete" when the creation of the low resolution image is completed (normal end), and to "XXX.failed" when the creation of the low resolution image is aborted (abnormal end) due to some abnormal incident.

"XXX" indicates an arbitrary character or character string, and a character string which is identical to the character string of the file name of the high resolution image 78 excluding the external identifier is automatically tagged to "XXX". For example, in the case in which the file name of the high resolution image 78 is "imageA.eps", the file name of the log file 80 becomes "imageA.continue" during the creation of the low resolution image, "imageA.complete" when the creation of the low resolution image is completed, and "imageA.failed" when the creation of the low resolution image is aborted.

At the GUI 120, icons 122 with different designs (see icons 122A, 122B, 122C in FIG. 11) are pre-set to correspond with the external identifiers of the log file 80 ("continue", "complete", "failed") respectively. Therefore, when a shell is made to display the log file 80, the appearance of the icon 122 changes according to the change in the file name, that is, according to the creation status of the low resolution image 20 (processing/successfully completed/aborted). The icons 122 have different colors rather than different designs to correspond with the external identifiers of the log file 80 ("continue", "complete", "failed"), and the color of the icon 122 of the log file 80 may change according to the status of the creation of the low resolution image 20.

When the file system of the server 12 is mounted from the editing workstation 10, a user can display the shell of the server on the display 10D of the editing workstation 10, and can also view the icon 122 of the log file 80.

The low resolution image 20 which is created is stored in the low resolution image folder 74 under the OPI folder 70 under which the high resolution image 78, which is the source image, is stored. The log file 80 is stored in the status folder 76 under the OPI folder 70 under which the high resolution image 78, which is the source image, is stored.

Figure 11:
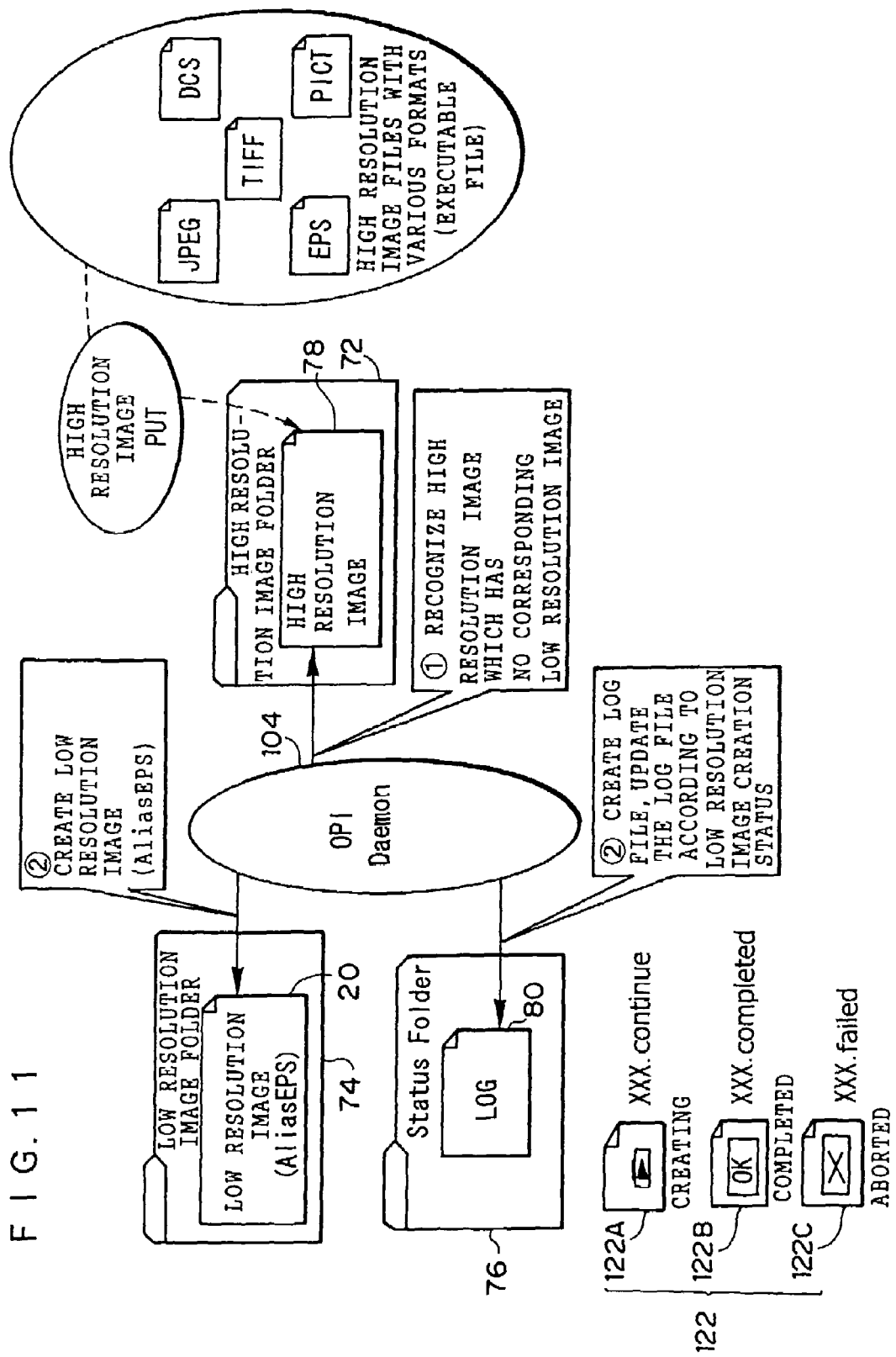
FIG. 11 is a conceptual diagram explaining an image transforming/conversion process.

For example, when a layout operation of a newly created high resolution image 78 is carried out by scanning the image by using a scanner or the like, or by performing image transforming processes, the low resolution image 20 can automatically be obtained by the OPI daemon 104 when a user simply copies the high resolution image 78 to the high resolution image folder 72 as shown in FIG. 11. More precisely, in the image monitoring process performed by the OPI daemon 104, when the high resolution image 78 in a state in which there is no corresponding low resolution image is recognized, a low resolution image creation job corresponding to the high resolution image 78 is generated. Subsequently, in the image transforming monitoring process, the low resolution image creation job is executed, and the low resolution image 20 is created in the low resolution image folder 74 accordingly. At this time, a log file corresponding to the high resolution image is also created. The file name and the icon 122 of the log file change according to the status of the creation of the low resolution image, so that the user can check the status of the creation of the low resolution image.

(OPI Filter)

The OPI filter 106 is linked with the image database 66 (see FIGS. 6 and 7). The PS data A from the editing workstation 10 is input to the OPI filter 106.

The OPI filter 106 analyzes the PS data A from the editing workstation 10. When the low resolution image 20 (AliasEPS) is included in the PS data A, the OPI filter 106 retrieves the high resolution image 78 corresponding to the low resolution image 20 from the image database 66. This retrieval is carried out by selectively utilizing the ID of the folder in which the high resolution image 78 is stored or the location path (names of the OPI directory 90 and the OPI folder 70, and an upper and lower hierarchical relationship between the folders) described in the comment 24, or the file name of the high resolution image 78 in accordance with retrieval conditions (e.g., retrieval giving priority to the folder ID/retrieval giving priority to the folder path/retrieval simply by the file name) which have been set by a user and stored in the OPI database 68. The high resolution image 78 may be retrieved by utilizing the folder name of the OPI folder 70 instead of the location path.

Moreover, the OPI filter 106 replaces the low resolution image 20 (AliasEPS) in the PS data with the retrieved high resolution image 78, thereby creating the PS data B having a high resolution image (such OPI method of replacing an image data having the AliasEPS format will be referred to as "AliasEPS-OPI method", hereinafter). At this time, when the high resolution image 78 in the image database 66 corresponding to the low resolution image 20 has the EPS format (DCS format may also be acceptable), the low resolution image 20 in the PS data is simply replaced with the high resolution image 78. When the high resolution image 78 in the image database 66 corresponding to the low resolution image 20 has a non-EPS format (such as TIFF, JPEG, or PICT), the high resolution image 78 is converted to the EPS format to create a high resolution image 78A, and the low resolution image 20 in the PS data is replaced with the high resolution image 78A.

Since the data having the EPS format used in the present embodiment is a self-concluding PS data, replacement of a data having the EPS format with another in the PS data can be operated without affecting other parts in the PS data. Therefore, the replacement of the low resolution image 20 with the high resolution image in the PS data can be performed simply by replacing the low resolution image 20 (AliasEPS) with the high resolution image (the high resolution image 78 with the EPS format or the high resolution image 78A) without modifying other descriptions in the PS data.

Figure 13:
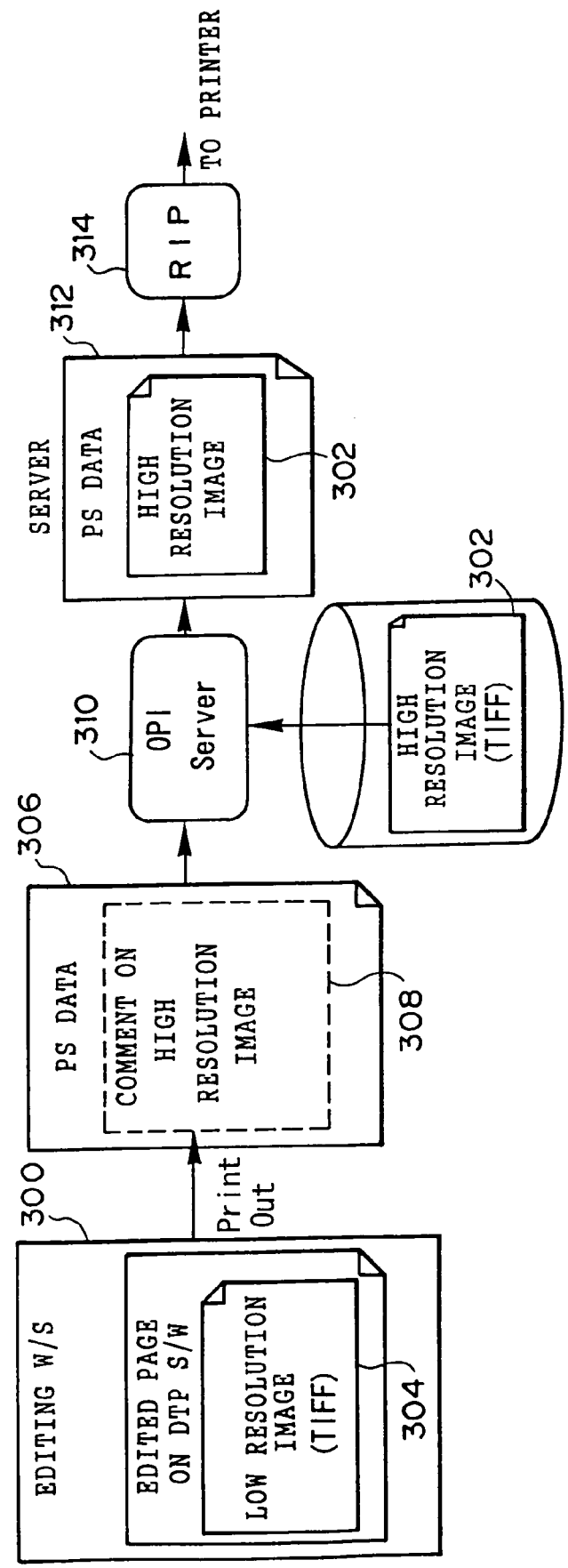
FIG. 13 is a conceptual diagram explaining a conventional OPI method (Aldus-OPI).

When the OPI filter 106 receives the PS data including a comment 308 about the high resolution image rather than the low resolution image 20 (i.e., PS data based on an Aldus-OPI method, see FIG. 13) from the editing workstation 10, the OPI filter 106 analyzes the comment 308, retrieves the corresponding high resolution image, and can rewrite the PS data so as to include the high resolution image. That is, the OPI filter 106 is adaptable to both the Aldus-OPI method and the AliasEPS-OPI method. Moreover, when the OPI filter 106 receives PS data A which has been sent with instruction not to perform an image replacement process, the OPI filter 106 may also output the received PS data A as it is without performing a replacement process.

The PS data B including the high resolution image 78 (or 78A) created by the OPI filter 106 is sent to the RIP 102. In the RIP 102, a page format image data is created on the basis of the PS data B. The image data is sent to the printer 14, and is then printed by the printer 14. In this way, printing is carried out with a desired layout and with an image portion based on the high resolution image 78.

(Operation)

Operation of the present embodiment in a case in which a low resolution image having an AliasEPS format is created from a high resolution image of various formats (such as EPS, TIFF, JPEG, DCS, and PICT), and printing is carried out following an editing operation using the low resolution image created (that is, an AliasEPS-OPI method) will be described hereinafter with reference to FIG. 7.

First, the high resolution image 78 is copied by a user into the image database 66 of the server 12, and more precisely, to the high resolution image folder 72 in the OPI folder 70 which has been created under the OPI directory 90. An OPI folder creation process will be described later in detail.

On the server 12, the OPI daemon 104 thins out the high resolution image 78 automatically to create the low resolution image 20 having the AliasEPS format. This process is referred to as a "low resolution image creation process", hereinafter.

A user performs an editing operation by using the editing software on the editing workstation 10. At this time, the low resolution image 20 (AliasEPS) created on the server 12 rather than the high resolution image 78 is used for determining image layout. When a print command is issued for the edited pages by the user after completion of the editing operation, the editing workstation 10 outputs the PS data A including the low resolution image 20 (AliasEPS) to the server 12.

On the server 12, the OPI filter 106 analyzes the received PS data A, and more precisely, analyzes the comment 24 on the low resolution image 20 (AliasEPS), and retrieves the high resolution image 78 corresponding to the low resolution image 20 (AliasEPS) in the PS data A. Subsequently, the low resolution image 20 (AliasEPS) in the PS data A is replaced with the retrieved high resolution image 78 (or 78A) to create the PS data B.

The PS data B which is created is passed to the RIP 102. The RIP 102 creates a page format image data on the basis of the PS data B including the high resolution image 78 (or 78A).

The server 12 transmits the image data created by the RIP 102 to the printer 14. The printer 14 performs printing on the basis of the received image data. In this way, printed matter which has a desired layout and whose image portion has been printed on the basis of the high resolution image 78 is output.

(OPI Folder Creation Process)

The processes performed by the above-described OPI 100 are executable only on the high resolution images 78 in the OPI folders 70. That is, functions of the OPI 100 can be utilized only in the OPI folders 70.

The creation processing of the OPI folder 70 in which the functions of the OPI 100 can be utilized will be described in detail hereinafter with reference to FIG. 9. A case in which an OPI folder 70 specifically named "April" is created under an OPI directory 90 named "Monthly" will be described as an illustration. Specific names of folders and files will be put within double quotation marks, hereinafter.

In creating the OPI folder 70, a user first mounts the file system of the server 12 from the editing workstation 10 in order to utilize the functions of the OPI 100, and then uses a shell to display the file system of the server 12. Accordingly, on the display 10D of the editing workstation 10, the file system of the server 12 is displayed with the OPI root directory 88 being taken as a top directory.

The user, then, creates a folder 70A under the OPI directory 90 "Monthly" by operating a mouse (not shown) or the like under a GUI environment of the editing workstation 10 while referring to the display 10D on which the file system of the server 12 is displayed. The user also names the created folder 70A "April".

The user, then, copies a preprovided authentication file 108 (corresponding to a "command file" of the present invention) to the created folder 70A "April" by operating the mouse (not shown) or the like under a GUI environment of the editing workstation 10 while referring to the display 10D on which the file system of the server 12 is displayed, thereby requesting the OPI 100 to manage the folder 70A "April".

The authentication file 108 is preprovided and stored in a prescribed folder. The present invention does not particularly specify the storing location. For example, the authentication file(s) 108 may be preprovided directly under each of the OPI directories 90, directly under the OPI root directory 88, or in the file system of the editing workstation 10.

Figure 12:
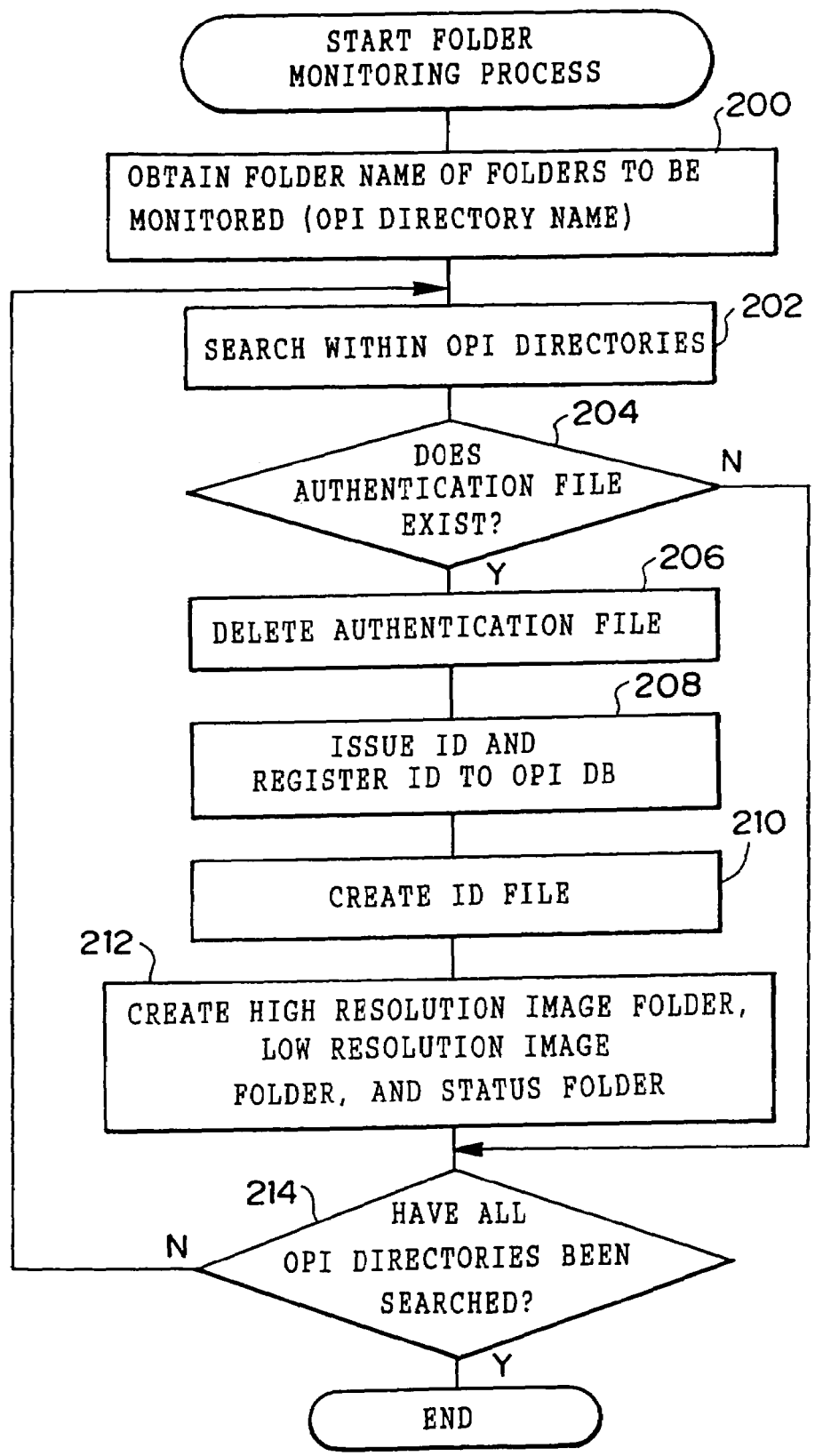
FIG. 12 is a flowchart showing a flow of the folder monitoring process.

On the other hand, the OPI daemon 104 constantly performs the folder monitoring process in the image database, that is, monitors all the file systems under the OPI directories 90 by using the folder and image monitoring process. FIG. 12 shows a flowchart of the folder monitoring process.

In the folder monitoring process, as shown in FIG. 12, first, in step 200, the names of the folders to be monitored (OPI configuration folders), i.e., the folder names of the OPI directories 90 are obtained from the OPI database 68. Thus, the folder name of the OPI directory 90, "Monthly", is obtained at this time.

Next, in step 202, each of the folders whose folder names were obtained in step 200 which were placed under the folders to be monitored (the OPI directory 90) is searched. If the authentication file 108 is found (i.e., affirmative response in step 204), then it is determined that the folder (in which the authentication file has been found) needs to be managed, and the process proceeds to step 206. Accordingly, while the OPI directory 90 "Monthly" is being searched in this case, the authentication file 108 copied to the created folder 70A "April" is recognized by the OPI daemon 104, and the process proceeds to step 206. If the authentication file 108 does not exist in the OPI directory 90 which is searched, the process proceeds to step 214 described later.

In step 206, the authentication file 108 is deleted from the folder in which the authentication file 108 has been recognized. Thus, in this case, the authentication file 108 is deleted from the folder 70A "April".

The process, then, proceeds to step 208 in which an unique folder ID which identifies the folder, i.e., a folder ID which has not been registered in the OPI database 68, is issued to the folder in which the authentication file 108 has been recognized. Also, the issued folder ID and the folder name of the folder in which the authentication file 108 has been recognized are registered additionally in the OPI database 68. Accordingly, in this case, a folder ID is issued to the folder 70A "April", and the issued folder ID and the folder name "April" are registered additionally in the OPI database 68 as the information indicating the OPI folder 70 located under the OPI directory 90 "Monthly".

Next, in step 210, an ID file 110 in which the issued folder ID is described is created in the folder in which the authentication file 108 is recognized. Accordingly, in this case, an ID file 110 is created in the folder 70A "April".

Next, in step 212, the high resolution image folder 72, the low resolution image folder 74, and the status folder 76 are created as the folders utilized by the OPI 100 in the folder in which the authentication file 108 is recognized. Thus, a high resolution image folder 72, a low resolution image folder 74, and a status folder 76 are also created in the folder 70A "April".

When the folder 70A has been registered in the OPI database, the ID file thereof has been created, and the high resolution image folder 72, the low resolution image folder 74, and the status folder 76 have been created as described above, the folder 70A is managed by the OPI 100 as the OPI folder 70 which can utilize the functions of the OPI 100.

Subsequently in step 214, a judgement is made as to whether all the folders to be monitored which were obtained in step 200, i.e., all the OPI directories 90, have been searched in step 202. If there exists any unsearched OPI directories 90, the process returns to step 202, and search is carried out in the unsearched OPI directories 90. When search is completed for all the OPI directories 90, the folder monitoring process ends.

The OPI daemon 104 executes the folder monitoring process repeatedly all the time while it is active. That is, on the server 12, the OPI daemon 104 has the folders which are under control of the OPI 100 (OPI configuration folders) constantly monitored, i.e., within the OPI directories 90. In this way, when a user simply copies the authentication file 108 as a command file in the folder 70A created under the OPI directory 90, the OPI daemon 104 issues a folder ID to the folder 70A, and the folder can be recognized as the OPI folder 70 which can utilize the functions of the OPI 100.

Moreover, as described above, a general client server system is provided with file transfer functions which enable a file to be transferred to the file system of the server 12 by an operation from the editing workstation 10 as standard functions. Therefore, the editing workstation 10 can cause the server 12 to perform certain processes (a process to transform the folder 70A into an OPI folder 70 in the above-described case) without using a software specifically designed for invoking the functions of the server 12.

Table 2 shows the present embodiment in comparison with the prior art.

TABLE 2

|  |  | Prior Art | Present Embodiment |
|---|---|---|---|
| Method | to invoke server functions from a client | Exclusive-use software for invoking server functions is used | An OPI daemon constantly monitors OPI directories (folders to be monitored) on a server An authentication file (command file) is transferred from a client to the folder monitored by the server |
| Result | Exclusive-use Software | necessary to develop exclusive-use software for each type of clients to provide (install) exclusive-use software in each client | unnecessary (file transfer function is a standard function of a client server system) |

In the present embodiment, the present invention is applied, as an example, to a process in which an ordinary folder 70A is made into a special folder, i.e., an OPI folder 70 capable of using the OPI functions, in a client server system for realizing an OPI system. The present invention, however, is not limited thereto, and the present invention may be applied to other data processes in the OPI system as well. Further, as might be expected, the present invention is not limited to the above-described OPI system based on the AliasEPS-OPI method, and may be applied to OPI systems based on other methods (Aldus-OPI method and the like) as well.

Still further, the present invention is not limited to a client server system for realizing an OPI system, and may be applied to other client server systems as long as the systems perform designated data processing or image processing.

As described above, the present invention has an excellent effect such that a client device can invoke functions of a server device without using exclusive-use software.

What is claimed is:

1. A method of performing a process by means of a server device, the method being used in a client server system for executing a designated data processing, in which a client device and a server device are connected via a network, wherein:

the server device constantly monitors prescribed folders in the server device;

and when existence of a command file which instructs execution of a designated process is recognized in the prescribed folders, the process instructed by the command file is performed.

2. A method of performing a process according to claim 1, wherein the client device transfers the command file to the server device.

3. A method of performing a process according to claim 1, wherein the client server system configures an OPI system, which creates low resolution image data for editing from high resolution image data, performs an editing operation by using the low resolution image data, and replaces the low resolution image data with the high resolution image data at the time of output, and the command file commands execution of a designated process which is performed in the OPI system.

4. A method of performing a process according to claim 3, wherein the command file instructs transformation of an ordinary folder into a folder in which the OPI system functions, and a transfer of the command file to an ordinary folder in the prescribed folders monitored by the server device causes the ordinary folder to be transformed to the folder in which the OPI system functions.

5. A method of performing a process according to claim 3, wherein the client device performs the editing operation.

6. A method of performing a process by means of a server device according to claim 3, wherein said OPI system comprises PostScript comments.

7. A method of performing a process according to claim 3, wherein said low resolution image data comprises:

a file name of the corresponding high resolution image data;

a data location path of the high resolution image data;

a folder ID of the prescribed folder in which the high resolution image is stored; and a format information of the high resolution image data.

8. A method of performing a process by means of a server device according to claim 1, wherein the client device copies the command file to the server device.

9. A method of performing a process by means of a server device according to claim 1, wherein said command file comprises authentication information comprising a request to manage the prescribed folders.

10. A method of performing a process by means of a server device according to claim 1, wherein an OPI daemon of the server device constantly monitors the prescribed folders of the server device.

11. A method of performing a process by means of a server device according to claim 1, wherein the client device is a processor, and the client provides the command file to the server device.

12. A method of performing a process by means of a server device, the method being used in a client server system for executing a designated image processing, in which a client device and a server device are connected via a network, wherein:
   the server device constantly monitors prescribed folders in the server device;
   and when existence of a command file which instructs execution of a designated process is recognized in the prescribed folders, the process instructed by the command file is performed.

13. A method of performing a process according to claim 12, wherein the client device transfers the command file to the server device.

14. A method of performing a process according to claim 12, wherein the client server system configures an OPI system, which creates low resolution image data for editing from high resolution image data, performs an editing operation by using the low resolution image data, and replaces the low resolution image data with the high resolution image data at the time of output, and
   the command file commands execution of a designated process which is performed in the OPI system.

15. A method of performing a process according to claim 14, wherein the command file instructs transformation of an ordinary folder into a folder in which the OPI system functions, and
   a transfer of the command file to an ordinary folder in the prescribed folders monitored by the server device causes the ordinary folder to be transformed to the folder in which the OPI system functions.

16. A method of performing a process according to claim 14, wherein the client device performs the editing operation.

17. A client server system for executing a designated data processing, which is configured with a client device and a server device connected via a network, comprising:
   a folder monitoring device to monitor prescribed folders in the server device;
   a file transfer device to transfer a command file which instructs execution of a designated process to the prescribed folders monitored by the folder monitoring device; and
   a process performing device to perform a process instructed by the command file on the server device when existence of the command file is recognized in the prescribed folders.

18. A client server system according to claim 17, further comprising a data replacing device to replace low resolution image data for editing created from high resolution image data with the high resolution image data.

19. A client server system according to claim 17, wherein the client server system configures an OPI system, which creates low resolution image data for editing from high resolution image data, performs an editing operation by using the low resolution image data, and replaces the low resolution image data with the high resolution image data at the time of output, and
   the command file instructs execution of a designated process which is performed in the OPI system.

20. A client server system according to claim 19, wherein the client device performs the editing operation.

21. A client server system according to claim 19, wherein the server device replaces the low resolution image data with the high resolution image data at the time of output.

22. A client server system according to claim 19, further comprising:
   an image database;
   wherein said image database comprises a plurality of OPI folders;
   wherein each of said plurality of OPI folders comprises at least one of each of a high resolution image folder, a low resolution image folder and a status folder.

23. A client server system according to claim 22, wherein said status folder comprises a log file which shows a status generation of the low resolution image data; and
   wherein a log file is created for each of the low resolution image data in the low resolution image folder; and
   wherein a log file is created for each of the high resolution image data in the high resolution image folder.

24. A client server system according to claim 22, further comprising:
   a subfolder;
   wherein a subfolder is provided under each of the high resolution image folder, the low resolution image folder, and the status folder.

25. A client server system according to claim 22, wherein when the low resolution image data located in the image database is in a state in which no corresponding high resolution image data is located in the image database, the low resolution image data is deleted.

26. A client server system according to claim 22, wherein when the high resolution image data in the image database is in a state in which no corresponding low resolution image data is in the image database, a low resolution image data corresponding to the high resolution image data is generated.

27. A client server system according to claim 22, wherein when a creation date of the low resolution image data is prior to that of a corresponding high resolution image data, the low resolution image data is created again; and
   wherein an older high resolution image data is automatically updated to be overwritten by a newly created low resolution image data.

28. A client server system according to claim 23, wherein a log file is generated at the same time the creation of the low resolution image data is initiated.

29. A client server system for executing a designated image processing, which is configured with a client device and a server device connected via a network, comprising:
   a folder monitoring device to monitor prescribed folders in the server device;
   a file transfer device to transfer a command file which instructs execution of a designated process to the prescribed folders monitored by the folder monitoring device; and
   a process performing device to perform a process instructed by the command file on the server device when existence of the command file is recognized in the prescribed folders.

30. A client server system according to claim 29, further comprising a data replacing device to replace low resolution image data for editing created from high resolution image data with the high resolution image data.

31. A client server system according to claim 29, wherein the client server system configures an OPI system, which creates low resolution image data for editing from high resolution image data, performs an editing operation by using the low resolution image data,
   and replaces the low resolution image data with the high resolution image data at the time of output, and
   the command file instructs execution of a designated process which is performed in the OPI system.

32. A client server system according to claim 31, wherein the client device performs the editing operation.

33. A client server system according to claim 31, wherein the server device replaces the low resolution image data with the high resolution image data at the time of output.

34. A method of performing a process by means of a server device, the method being used in a client server system for executing a designated data processing, in which a client device and a server device are connected via a network, wherein:
- the server device constantly monitors prescribed folders in the server device;
- the client server system configures an OPI system;
- wherein when a command file which instructs execution of a designated process is recognized in the prescribed folders, the process instructed by the command file is performed;
- wherein the command file instructs transformation of an ordinary folder into a folder in which the OPI system functions; and
- a transfer of the command file to an ordinary folder in the prescribed folders monitored by the server device causes the ordinary folder to be transformed to the folder in which the OPI system functions.

35. A method of performing a process by means of a server device, the method being used in a client server system for executing a designated image processing, in which a client device and a server device are connected via a network, wherein:
- the server device constantly monitors prescribed folders in the server device;
- the client server system configures an OPI system;
- wherein when a command file which instructs execution of a designated process is recognized in the prescribed folders, the process instructed by the command file is performed;
- wherein the command file instructs transformation of an ordinary folder into a folder in which the OPI system functions; and
- a transfer of the command file to an ordinary folder in the prescribed folders monitored by the server device causes the ordinary folder to be transformed to the folder in which the OPI system functions.

* * * * *